(12) United States Patent
Sasser et al.

(10) Patent No.: US 12,522,815 B2
(45) Date of Patent: Jan. 13, 2026

(54) BARRIERS IN MICROFLUIDIC CHANNELS

(71) Applicant: Hewlett-Packard Development Company, L.P., Spring, TX (US)

(72) Inventors: Jacob Shane Sasser, San Luis Obispo, CA (US); Alexander Govyadinov, Corvallis, OR (US); Brian J. Keefe, San Diego, CA (US); David S. Clague, San Luis Obispo, CA (US); Natalie Taylor Weisenburger, San Luis Obispo, CA (US); Nicolas Robert Medjo, San Luis Obispo, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 482 days.

(21) Appl. No.: 18/023,316

(22) PCT Filed: Aug. 28, 2020

(86) PCT No.: PCT/US2020/048486
§ 371 (c)(1),
(2) Date: Feb. 24, 2023

(87) PCT Pub. No.: WO2022/046079
PCT Pub. Date: Mar. 3, 2022

(65) Prior Publication Data
US 2023/0303996 A1    Sep. 28, 2023

(51) Int. Cl.
*C12N 15/10* (2006.01)
*B01L 3/00* (2006.01)
*G01N 33/543* (2006.01)

(52) U.S. Cl.
CPC .... *C12N 15/1006* (2013.01); *B01L 3/502761* (2013.01); *B01L 2200/0652* (2013.01); *B01L 2400/086* (2013.01); *G01N 33/54366* (2013.01)

(58) Field of Classification Search
CPC .......... C12N 15/1006; B01L 3/502761; B01L 2200/0652; B01L 2400/086; G01N 33/54366
See application file for complete search history.

(56) References Cited

U.S. PATENT DOCUMENTS 10,627,395 B2    4/2020   Wang et al.
2012/0053335 A1  3/2012   Liu et al.
(Continued)

FOREIGN PATENT DOCUMENTS

EP          2530168 A1    12/2012
KR   10-2012-0118294 A    10/2012
(Continued)

OTHER PUBLICATIONS

Sethu, Palaniappan et al., "Microfluidic Isolation of Leukocytes from Whole Blood for Phenotype and Gene Expression Analysis", Analytical Chemistry, vol. 78, No. 15, 2006, pp. 5453-5461.

*Primary Examiner* — Benjamin R Whatley
(74) *Attorney, Agent, or Firm* — Foley & Lardner LLP (57) ABSTRACT

In one example in accordance with the present disclosure, a fluid manipulation system is described. The fluid manipulation system includes a microfluidic channel through which fluid is to flow. The fluid includes biomolecules to be separated. The fluid manipulation system also includes at least one array of biomolecule-capturing pillars disposed within the microfluidic channel to capture biomolecules from the fluid. Barriers rise from a surface of the microfluidic channel. The barriers span a width of the microfluidic channel orthogonal to a flow of the fluid to induce vortices in the fluid flow.

12 Claims, 10 Drawing Sheets

(56) References Cited

U.S. PATENT DOCUMENTS

| | | |
|---|---|---|
| 2012/0077260 A1 | 3/2012 | Sharon et al. |
| 2018/0074039 A1* | 3/2018 | Soper ................. B01L 3/502761 |
| 2018/0230453 A1* | 8/2018 | Lee .................... C12N 15/1017 |
| 2021/0178393 A1* | 6/2021 | Craighead ......... B01L 3/502753 |
| 2023/0263552 A1* | 8/2023 | Mokhtare .............. C12M 21/06 |
| | | 600/34 |

FOREIGN PATENT DOCUMENTS

| | | |
|---|---|---|
| WO | 2004/040001 A2 | 5/2004 |
| WO | 2006/087655 A1 | 8/2006 |

\* cited by examiner

BARRIERS IN MICROFLUIDIC CHANNELS

CROSS-REFERENCE TO RELATED APPLICATIONS

This application is filed under 35 U.S.C. § 371 as a National Stage of PCT International Application No. PCT/US2020/048486, filed Aug. 28, 2020, which is incorporated by reference herein in its entirety.

BACKGROUND

Analytic chemistry is a field of chemistry that uses instruments to separate, identify, and quantify matter. In one particular example, cells, organelles, and molecules within a sample can be extracted and analyzed. A wealth of information can be gleaned from the extracted cells, organelles, and particles.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Analytic chemistry involves the study and analysis of cellular components such as cells, nucleic acid, and molecules contained within a fluid sample. One particular example of a biological compound that is studied and yields a wealth of information is nucleic acid. Nucleic acid is a fundamental building block of all living things. Therefore, the study and analysis of nucleic acid may provide insight into how living things operate and may provide information to treat certain ailments. As a specific example, the study of nucleic acids may lead to the treatment of certain disorders that plague society. As another example, the capture of exogenous deoxyribonucleic acid (DNA) and ribonucleic acid (RNA) from a blood sample may be used to detect cell necrosis. In yet another example, DNA may be isolated to identify an organism or to identify damage such as single nucleotide polymorphisms. Still furthers genes may be isolated for replication.

While such biomolecules can provide valuable information for subsequent analysis, current methods of analyzing these biomolecules lack refinement and can inhibit the accuracy and reliability of their analysis. For example, before a particle, compound, or other chemical structure can be studied, it is first extracted from a fluid and concentrated into an amount that can be effectively studied. Accordingly, the present specification describes a system that separates the nucleic acid, or any other biomolecules to be studied, from the sample or carrier fluid in which it is disposed. The present specification, as compared to others, provides efficient extraction.

That is, separation of biomolecules from a fluid may be complex and costly. In some examples, a fluid flow may be introduced into a channel and separating structures may be used to capture target biomolecules. However, due to a low Reynolds number that may exist in microfluidic flow, there may be limited mixing and a low rate of biomolecule extraction as biomolecules pass through the separating structure without being captured.

Accordingly, the present specification describes a fluid manipulation system that increases the rate of extraction. Specifically, the present fluid manipulation system includes vortex-inducing barriers to increase the interaction of the fluid with biomolecule-capturing structures. Specifically, the present fluid manipulation system provides for nucleic acid, or other biomolecule, adsorption using solid phase extraction. The fluid manipulation system includes a microfluidic channel that combines impediments to flow such as chevron, or herringbone barriers with arrays of silica pillar structures. The barriers stimulate formation of stable vortices which increase an effective particle/DNA path length and increase residence time inside the microfluidic channel to interface with and be extracted by the biomolecule-capturing pillars. Doing so increases the mixing efficiency and augments biomolecule adsorption onto the pillar structures.

Specifically, the present specification describes a fluid manipulation system that includes a microfluidic channel through which fluid is to flow. The fluid includes biomolecules to be separated. At least one array of biomolecule-capturing pillars is disposed within the microfluidic channel to capture biomolecules from the fluid. Barriers rise from a surface of the microfluidic channel. The barriers span a width of the microfluidic channel in a direction orthogonal to a flow of the fluid. The barriers induce vortices in the fluid flow.

In an example, the barriers are formed on at least one of a floor of the microfluidic channel and a ceiling of the microfluidic channel and are 1) straight barriers which are perpendicular to a direction of fluid flow through the microfluidic channel or 2) chevron barriers wherein a point of a chevron barrier is parallel to the direction of fluid flow through the microfluidic channel. In this example, the point of the chevron barrier may be off-center from the microfluidic channel. In an example, the barriers are formed on multiple surfaces of the microfluidic channel.

In an example, the at least one array of biomolecule-capturing pillars includes multiple arrays of biomolecule-capturing pillars where each array is positioned between sections of the surface of the microfluidic channel with barriers.

In an example, the at least one array of biomolecule-capturing pillars are formed in at least one of chevron rows, s-shaped rows, and sigmoidal rows. The at least one array of biomolecule-capturing pillars may include biomolecule-capturing pillars of differing sizes and shapes. For example, the biomolecule-capturing pillars may have a round, triangular, rectangular, ovular, rhomboidal, elliptical, or diamond cross-section. Moreover, the cross-sectional area may have different values, with the different areas to capture biomolecules with different characteristics. For example, larger biomolecule-capturing pillars spaced farther apart may capture larger biomolecules while biomolecule-capturing pillars with smaller cross-sectional areas and that are spaced more closely together may capture smaller biomolecules. The cross-sectional shape and dimensions of the biomolecule-capturing pillars may be selected based on the characteristics of the biomolecule to be captured and the fluid in which the biomolecule is dispersed.

In an example, the at least one array of biomolecule-capturing pillars is seated in a trench on the surface of the microfluidic channel. Protrusions may rise from at least one of a floor and a ceiling of the microfluidic channel and may be formed along walls of the microfluidic channel. In another example, the biomolecule-capturing pillars extend from a floor of the microfluidic channel to a ceiling of the microfluidic channel.

The present specification also describes a method. According to the method, a fluid containing biomolecules is introduced into a microfluidic channel. Vortices are induced in the fluid flow via chevron barriers rising from a surface of the microfluidic channel. Points of the chevron barriers are parallel to a direction of fluid flow through the microfluidic channel. Biomolecules within the fluid are then captured via adsorption onto biomolecule-capturing pillars within the microfluidic channel. In one example, the biomolecule to be captured is nucleic acid in a fluid sample.

In another example, the fluid manipulation system includes a microfluidic channel through which fluid is to flow. The fluid includes biomolecules to be separated. A floor of the microfluidic channel has regions of chevron barriers to induce vortices in the fluid flow. A point of a chevron barrier is parallel to a direction of fluid flow through the microfluidic channel. Between each region of chevron barriers is at least one chevron row of biomolecule-capturing pillars to separate particles from the fluid.

In an example, a spacing between adjacent biomolecule-capturing pillars is at least twice a pillar diameter. Still further, a chevron barrier width may be at least a pillar diameter.

As used in the present specification and in the appended claims, the term "biomolecule" may refer to molecules such as amino acids, sugars, nucleic acids, proteins, polysaccharides, DNA, RNA, cells, and organelles that occur naturally in living organisms. One specific example of biomolecules to be captured include deoxyribonucleic acid (DNA) and ribonucleic acid (RNA). In an example, the biomolecules to be captured may include bio-macromolecules which are large macromolecules (or polyanions) such as proteins, carbohydrates, lipids, and nucleic acids (such as DNA and RNA) as well as small molecules such as primary metabolites, secondary metabolites, and natural products. In some examples, this class of material may be referred to as biological materials. Other examples of biomolecules that may be captured include cells such as mammalian cells and non-mammalian cells.

Further, as used in the present specification and in the appended claims, the term "chevron" refers to a pointed shape. That is, a chevron barrier may refer to a V-shaped barrier. In the examples discussed below, the point of the chevron, or V-shaped barrier, may be parallel to the direction of a flow of fluid through the channel.

In summary, using such a fluid manipulation system 1) provides efficient biomolecule separation from a liquid carrier; 2) may reduce the size of the fluid manipulation system by capturing more biomolecules in a smaller distance; 3) increases biomolecule time in a biomolecule-capturing region; 4) includes vortices to increase mixing and probability for biomolecule capture; 5) provides large surface area for capturing biomolecules; 6) is a simple structure to integrate on a chip; 7) provides low fluidic resistance; and 8) is low cost. However, the devices disclosed herein may address other matters and deficiencies in a number of technical areas.

Figure 1:
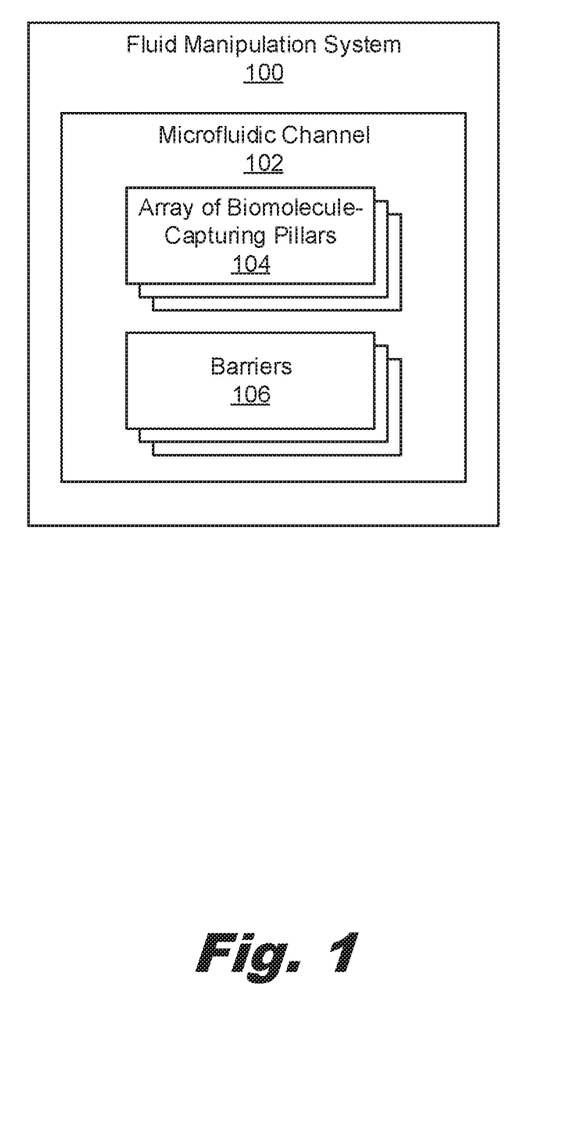
FIG. 1 is a block diagram of a fluid manipulation system with barriers in a microfluidic channel, according to an example of the principles described herein.

Turning now to the figures, FIG. 1 is a block diagram of a fluid manipulation system (100) with barriers (106) in a microfluidic channel (102), according to an example of the principles described herein. The fluid manipulation system (100) is a collection of components for separating and analyzing a fluid sample. In some examples, the fluid manipulation system (100) is a microfluidic structure. In other words, the components, i.e., the microfluidic channel (102), biomolecule-capturing pillars (104), and barriers (106) may be microfluidic structures. A microfluidic structure is a structure of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

The fluid manipulation system (100) includes a microfluidic channel through which fluid is to flow. The fluid may include particles that are to be separated. For example, the fluid may be a solution that includes biomolecule such as deoxyribonucleic acid (DNA) or ribonucleic acid (RNA). A scientist may desire to separate the DNA or RNA from the fluid such that the DNA or RNA may be extracted, studied, processed, or otherwise acted upon. As one specific example, a polymerase chain reaction (PCR) is an operation wherein millions or billions of copies of a specific DNA sample are replicated. However, prior to PCR, the DNA in a given sample may be separated and concentrated via the fluid manipulation system (100) to enhance PCR efficacy.

In some examples, the fluid flow through the microfluidic channel (102) may be generated by a pump that is disposed upstream or downstream from the particle-capturing region of the microfluidic channel (102). In some examples, the pump may be an integrated pump, meaning the pump is integrated into a wall of the microfluidic channel (102). In some examples, the pump may be an inertial pump which refers to a pump which is in an asymmetric position within the microfluidic channel (102). In some examples, the pump may be a thermal inkjet resistor, or a piezo-drive membrane or any other displacement device.

To capture the DNA strands or other particles of interest, the fluid manipulation system (100) includes at least one array (104) of biomolecule-capturing pillars disposed within the microfluidic channel (102). In some examples, the biomolecule-capturing pillars may be used in solid phase extraction (SPE). SPE may target various biomolecules such as DNA for extraction and isolation. As a specific example, nucleic acid testing may use a genomic target which is one of many markers to specifically identify pathogens. In this example, SPE may include five stages: cell lysis, sample preparation, nucleic acid absorption, washing, and elution. Cellular components such as membranes that surround and protect the DNA are first lysed or breached to allow for the DNA extraction to occur. The released double-stranded DNA (dsDNA) is then separated from the other debris; exposed dsDNA is mixed with a solid phase or sorbent for extraction. In some examples, the sorbent mix may be conditioned with a buffer to prepare the functional groups on the sorbent matrix to bind to the phosphate backbone of DNA.

Separating the dsDNA from the other debris may be carried out by the fluid manipulation system (100). In a specific example, the fluid is moved past the biomolecule-capturing pillars, and the biomolecules are adsorbed onto the biomolecule-capturing pillars. In this example, the biomolecule-capturing pillars may be functionalized for either specific or non-specific binding for analytes such as DNA or RNA. In one example, surface functionalization may be accomplished by using a material such as silica to fabricate the pillars.

In some examples, the biomolecule-capturing pillars are silica pillars that provide additional surface area to interact with and ultimately capture the DNA. The biomolecule-capturing pillars, given the appropriate fluid chemistry and reagents, may be coated with a chaotropic agent and/or obstacles to mediate/enhance the biomolecule-to-surface interaction. While silica is referenced as one pillar surface feature to capture biomolecules, other compounds may be used to mediate/enhance the capturing capability of the pillars. Examples include chitosan and amino acids.

In another example, a magnetic material of the pillars may be used to tether beads to the pillars. These beads may increase the capture rate of the biomolecules from the fluid. In some examples, the beads may be formed of a paramagnetic material such as polystyrene or iron oxide and may have a size between 1 and 10 microns.

In some examples, the beads themselves may be magnetic or paramagnetic. Magnetic bead-based SPE offers a platform to manipulate DNA absorption and desorption while being easily scalable and reproducible. In one example, micron-sized paramagnetic beads coated with a silica sorbent matrix may be utilized to bind to the DNA. These paramagnetic beads exhibit non-magnetic behavior unless exposed to an external magnetic field. Doing so allows the beads to become immobilized under the presence of a magnetic field for separation processes, removing the need for repeated centrifugation or spin column separation. Implementing surface-functionalized magnetic beads in microfluidic systems allows for a high surface-to-volume ratio for optimal binding efficiency.

In this example, either the beads or the pillars themselves may be functionalized to attract biomolecules passing by. Such functionalization may be based on specific or non-specific binding of a target biomolecule. An example of a specific binding surface is a reverse primer, which would be a complement to a target nucleic acid sequence and capture the target nucleic acids. An example of a non-specific binding surface is streptavidin which may be used to isolate biotinylated targets including oligomers and antibodies. Such a non-specific binding surface may be sticky to biologic substances.

Note that in these examples, the beads and/or the pillars may be functionalized. That is the pillars may include a coating or surface material to attract the beads and/or biomolecules. The beads also may include a coating or surface material to attract a target biomolecule. Note that the functionalization of the beads and pillars could be similar or perhaps complementary depending upon differences in material properties affecting functionalization or the desire for different functionalization for a desired interaction.

The use of beads and pillars together may allow for customized assays based on a more universal microfluidic device. That is, a base microfluidic device with wide application may be implemented and a target biomolecule may be targeted via functionalized beads. In addition, functionalization of the beads and pillars can be optimized for bead aggregation together with specific or non-specific binding of target analyte in conjunction with reagent chemistry that may be adjusted to elute the from surfaces, e.g., through the use of salts, pH changes, or surfactants.

For example, the beads may decrease the distance between adjacent pillars such that more biomolecules are captured. The beads may also disrupt the flow paths between the pillars so as to increase biomolecule capture rates. Once a sample has been transported through the microfluidic channel (102), the extracted biomolecules may be captured from the pillars for subsequent analysis.

While the array (104) of biomolecule-capturing pillars may allow capture of a portion of the biomolecules from the fluid, it may be the case that some biomolecules pass through the microfluidic channel (102) without being captured at all. For example, given the dimension of the microfluidic channel (102), the fluid flow may have a low Reynolds number such that fluid and biomolecules flow past the array (104) of biomolecule-capturing pillars, in some cases without interacting with the biomolecule-capturing pillars. That is, due to portions of the flow falling within the Stokes flow regime, it may be that the capture radius of each biomolecule-capturing pillar is relatively small. Accordingly, to ensure a sufficient capture rate, some systems implement a longer and more resistive microfluidic path to ensure adequate capture. However, the longer path results in a larger microfluidic device that may include complicated and torturous paths.

Accordingly, the current fluid manipulation system (100) includes barriers (106) that rise from a surface of the microfluidic channel (102). In a specific example, the surface that the barriers (106) rise from is a floor of the microfluidic channel (102). In other examples, the barriers (106) extend from a ceiling of the microfluidic channel (102). In yet another example, the barriers rise from multiple surfaces of the microfluidic channel (102) such as from both the floor and the ceiling. The barriers (106) span a width of the microfluidic channel (102) and induce transverse flows where the fluid elements are stretched and folded forming vortex-like fluid structures. That is, as the fluid flows along its path, the fluid encounters the barriers (106). At the low Reynolds number found within the microfluidic channel (102), the fluid conforms to the morphology of the solid structure which introduces fluid element stretching and folding, resulting in counter-rotating vortices. The creation of the counter-rotating vortices increases the fluid path length through the microfluidic channel (102). The extra fluid path length in these fluid structures increases the local residence time of fluid within the microfluidic channel (102) and alters the fluid flow path. Thus, the fluid does not flow as quickly as it would through an unmodified microfluidic channel (102). Put another way, the counter-rotating vortices increase the amount of time that fluid is in the microfluidic channel (102) and thus increase the time the biomolecules spend in the vicinity of biomolecule-capturing pillars. Doing so increases the likelihood that biomolecules may interact with the array (104) of biomolecule-capturing pillars.

In addition, the vortices cause particles to flow through a greater range of the channel depth to encounter a larger area of the biomolecule-capturing pillars.

Accordingly, the barriers (106), which extend from a surface, introduce vortices which disturb the laminar flow of fluid through the microfluidic channel (102) such that there is more interaction between the biomolecules and the biomolecule-capturing pillars. The barriers (106) maintain the fluid in the biomolecule-capturing region for a longer period of time, also increasing the capture rate of the array (104) of biomolecule-capturing pillars. Accordingly, an overall greater percentage of the target biomolecules interact with and are captured by the biomolecule-capturing pillars.

The barriers (106) may also pre-mix the fluid to render a more uniform distribution of biomolecules throughout the fluid. That is, over time, biomolecules in the fluid sample may form local regions of high and low concentration, settle or otherwise aggregate prior to entering the array (104). Inhomogeneous mixtures of target biomolecules, reagents and debris may hinder chaotropic mediated extraction and cause clogging, thereby reducing the extraction and recovery of biomolecules form a fluid. Similarly, biomolecules that settle may not be separated and recovered in a programmable fashion. Accordingly, the barriers (106) provide for a more uniform distribution of biomolecules throughout the fluid such that the biomolecules are more effectively extracted and recovered.

As will be demonstrated below in various examples, the barriers (106) may be of a variety of shapes and sizes. For example, the barriers (106) may be straight and perpendicular to the flow of fluid through the microfluidic channel (102). In other examples, the barriers (106) may be chevron, or herringbone shaped.

Figure 2A:
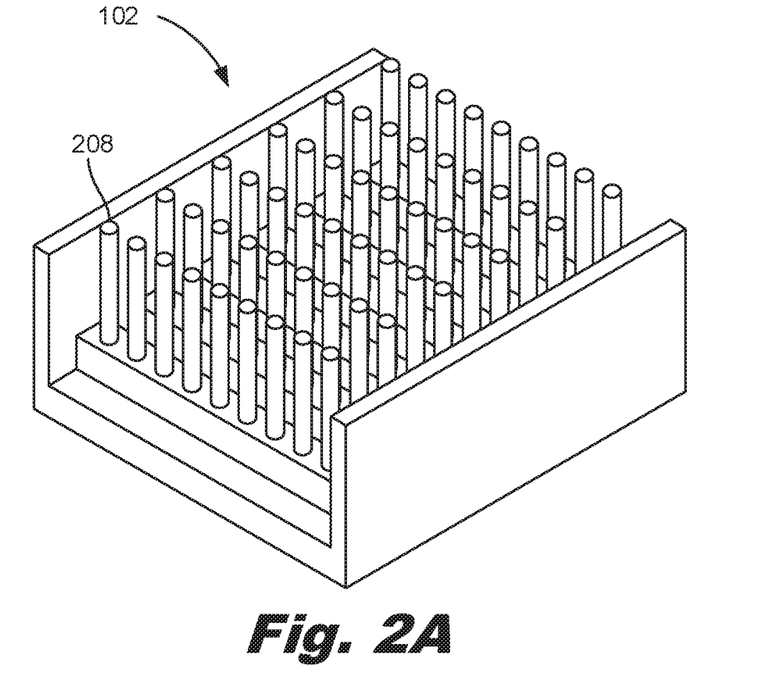
FIGS. 2A and 2B are diagrams of barriers in a microfluidic channel, according to examples of the principles described herein.
Figure 2B:
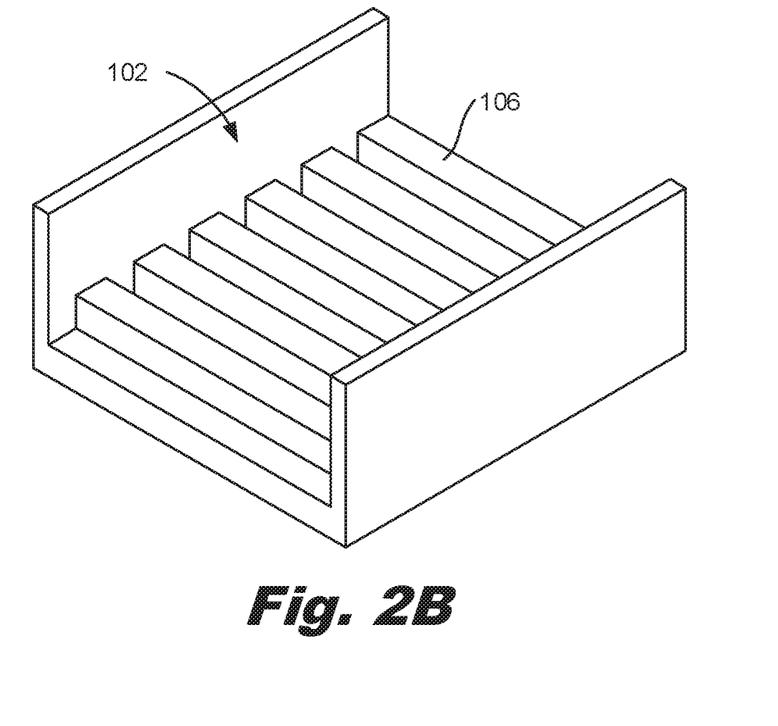

FIGS. 2A and 2B are diagrams of barriers (106) in a microfluidic channel (102), according to examples of the principles described herein. Specifically, FIG. 2A depicts a microfluidic channel (102) with the array (FIG. 1, 104) of biomolecule-capturing pillars (208) depicted on a floor of the microfluidic channel (102) while FIG. 2B depicts the microfluidic channel (102) with the biomolecule-capturing pillars (208) removed for simplicity in viewing the characteristics of the barriers (106). For simplicity in FIGS. 2A and 2B and others, a few instances of some of the components are indicated by reference numbers.

As described above, the microfluidic channel (102) may be a microfluidic structure. For example, the depth of the microfluidic channel (102) may be between 20 and 500 micrometers and the width of the microfluidic channel (102) may be between 100 and 3,500 micrometers. In a specific example, a depth-to-width ratio of the microfluidic channel (102) is between 1:3 and 1:100.

Note that while in FIG. 2A, the biomolecule-capturing pillars (208) are depicted as having a particular shape and size, the biomolecule-capturing pillars (208) may be formed to have any cross-sectional shape and size. For example, the biomolecule-capturing pillars (208) may have a round, triangular, rectangular, ovular, rhomboidal, elliptical, or diamond cross-section. The cross-sectional shape and dimensions of the biomolecule-capturing pillars (208) may be selected based on the characteristics of the biomolecule to be captured and the fluid in which the biomolecule is dispersed.

Note also that while FIG. 2A depicts a particular configuration and spacing of the biomolecule-capturing pillars (208) a variety of spacings may be used. For example, a spacing between adjacent biomolecule-capturing pillars (208) may be at least twice a pillar (208) diameter. For example, the biomolecule-capturing pillars (208) may be between 2 and 50 micrometers in cross-sectional diameter and have a height of between 20 and 500 micrometers, such that a biomolecule-capturing pillar (208) aspect ratio may be between 1:10 and 1:100.

In this example, the center-to-center spacing of the biomolecule-capturing pillars (208) may be between 10 and 100 micrometers. The spacing, size, and shape of the biomolecule-capturing pillars (208) may be determined based on the biomolecule to be captured and other characteristics such as the size of the barriers (106), and in some examples the flow rate past the biomolecule-capturing pillars (208).

FIG. 2B clearly depicts the barriers (106) rising from the floor of the microfluidic channel (102). As fluid flows past the barriers (106), the abrupt surface of the barrier (106) face disrupts the fluid flow creating micro vortexes. Thus, the fluid is slowed and mixed such that it is more likely to interact with the biomolecule-capturing pillars (208). As depicted in FIG. 2A, the biomolecule-capturing pillars (208) may be formed on top of the barriers (106).

The barriers (106) may be in a variety of forms. For example, the barriers (106) may be straight barriers (106) which are perpendicular to a direction of fluid flow through the microfluidic channel (102). As with the biomolecule-capturing pillars (208), the barriers (106) may have a variety of dimensions. For examples, the barriers (106) may rise 50 micrometers from the floor of the microfluidic channel (102). The barriers (106) may also be 50 micrometers long in a direction of the fluid flow in a particular example.

As described above, the presence of the barriers (106), by introducing fluid slowing vortices and by introducing fluid element stretching and folding into the fluid flow, 1) increases the amount of time that fluid is within a biomolecule-capturing region and 2) increases the likelihood that biomolecules will interface with the biomolecule-capturing pillars (208) rather than simply passing by. Accordingly, the present fluid manipulation system (FIG. 1, 100) provides a higher rate of biomolecule extraction using a smaller relative region of a microfluidic structure. That is, rather than having long microfluidic channels (102) with potentially complex and tortuous fluid paths, a shorter microfluidic channel (102) with barriers (106) may collect a similar quantity of biomolecules in a relatively smaller space. Moreover, the more effective collection of biomolecules from a sample may provide greater biomolecule yield from a particular sample.

As described above, while FIGS. 2A and 2B depict the barriers (106) rising from a floor surface of the microfluidic channel (102), in some examples the barriers (106) may drop from a ceiling surface of the microfluidic channel (102).

Figure 3A:
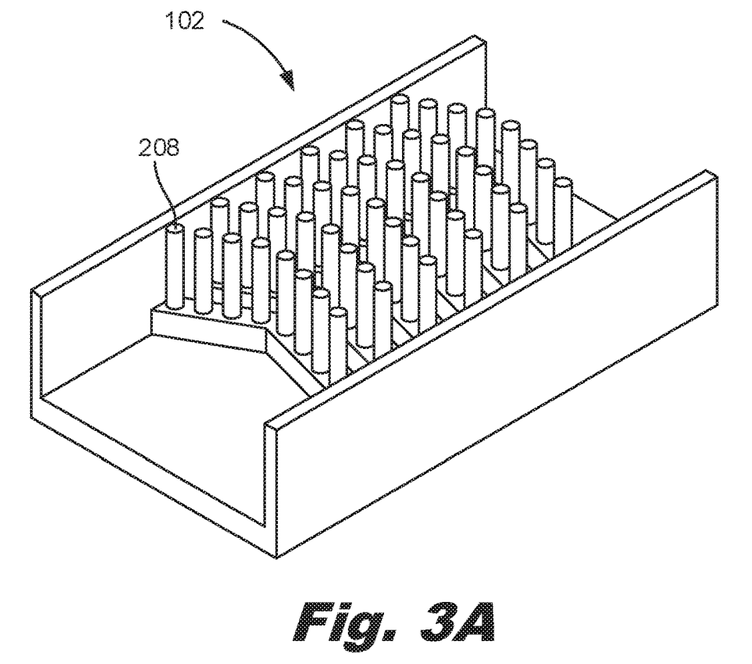
FIGS. 3A and 3B are diagrams of barriers in a microfluidic channel, according to examples of the principles described herein.
Figure 3B:
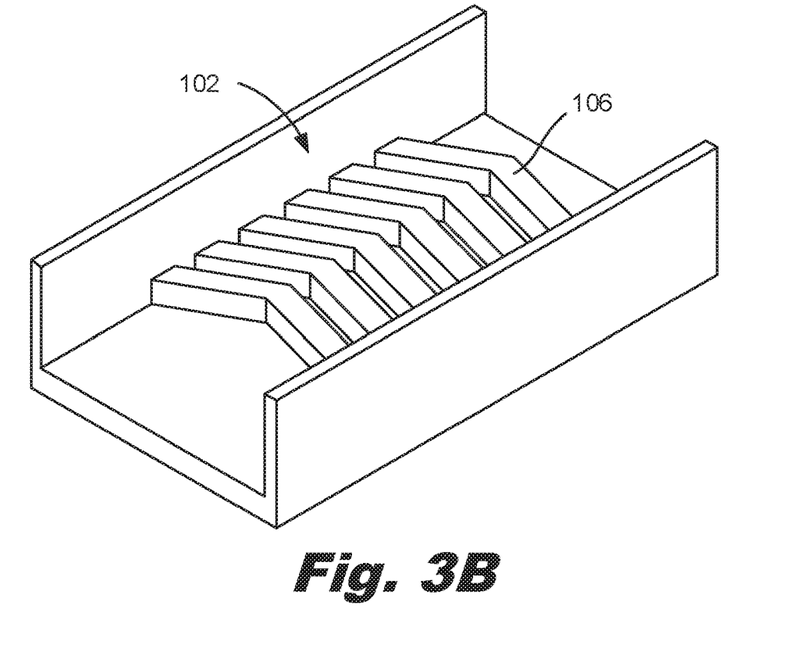

FIGS. 3A and 3B are diagrams of barriers (106) in a microfluidic channel (102), according to examples of the principles described herein. In the example depicted in FIGS. 3A and 3B, rather than straight barriers (106), the fluid manipulation system (100) includes chevron barriers (106) where a point of a chevron barrier is parallel to a direction of fluid flow through the microfluidic channel. The chevron barrier (106) region may pre-mix the fluid prior to entry into the array (FIG. 1, 104) of biomolecule-capturing pillars (208). Doing so increases the capture rate. While FIGS. 3A and 3B depict a particular chevron barrier (106) structure, any number and pattern of chevron barriers (106)

may be used to optimize capture efficiency and reduce the overall size of the biomolecule-capturing region.

In some examples, such as that depicted in FIGS. 3A and 3B, the point of the chevron barriers (106) may be off-center from the microfluidic channel (102). Doing so may increase the vortex-inducing capability of the barriers (106). That is, an off-center chevron may create a staggered herringbone micromixer, which may result in enhanced mixing. In other examples, the points of the chevron barriers (106) may be aligned with the center of the microfluidic channel (102).

In the example depicted in FIGS. 3A and 3B, the array (FIG. 1, 104) of biomolecule-capturing pillars (208) are also formed in a chevron row. Note, that while FIG. 3A depicts a single row of biomolecule-capturing pillars (208) on each barrier (106), it may be the case that more rows of biomolecule-capturing pillars (208) are disposed on each barrier (106). That is, multiple rows of biomolecule-capturing pillars (208) may be disposed on each recess-defined barrier (106).

Note that in both examples depicted in FIGS. 2A and 3A, the at least one array (FIG. 1, 104) of biomolecule-capturing pillars (208) include multiple arrays (FIG. 1, 104) of biomolecule-capturing pillars (208). In each example, each array (FIG. 1, 104) is positioned on sections of the floor with barriers (106) or on individual barriers (106).

In other words, as depicted in FIGS. 3A and 3B, a floor of the microfluidic channel (102) has regions of chevron barriers (106) to induce vortices in the fluid flow. On each chevron barrier (106), at least one chevron row of biomolecule-capturing pillars (208) separate biomolecules in the fluid from the liquid carrier of the fluid.

In an example, the chevron barrier (106) may have a width at least as great as a biomolecule-capturing pillar (208) diameter. For example, the barriers (106) may have a height of between 10 and 100 micrometers and a width of between 15 and 100 micrometers, wherein a width is at least as great as the biomolecule-capturing pillar (208) diameter.

Note also that while FIGS. 3A and 3B depict a particular chevron angle, a variety of chevron angles may be implemented. For example, the arms of the chevron may have an interior angle of 45 degrees, 90 degrees, 135 degrees between them, or any other chevron angle. The chevron angle may alter the vortices that are induced and accordingly may be selected based on the biomolecule to be separated, the spacing of the biomolecule-capturing pillars (208) and/or the fluid flow rate through the microfluidic channel (102), among other criteria.

Figure 4A:
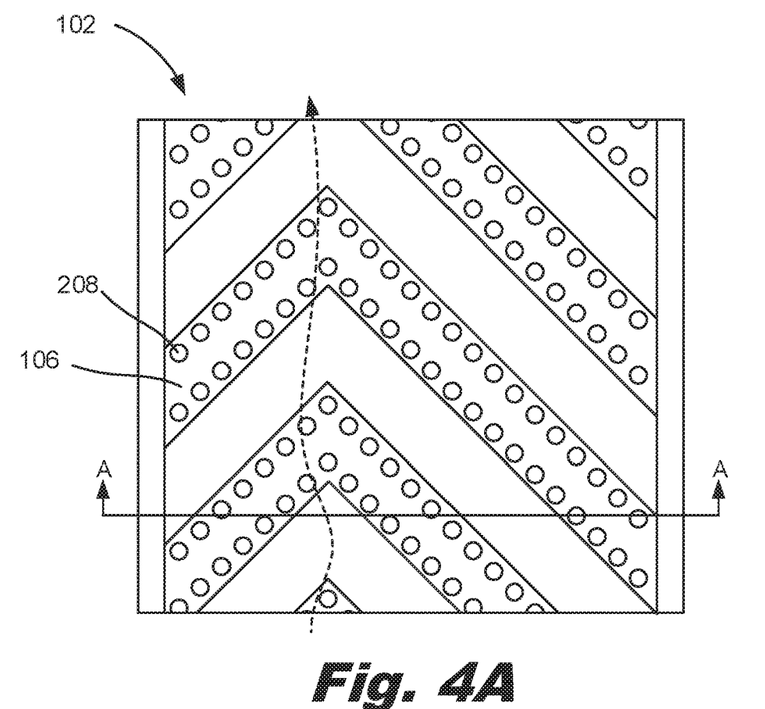
FIGS. 4A and 4B are diagrams of barriers in a microfluidic channel, according to examples of the principles described herein.
Figure 4B:
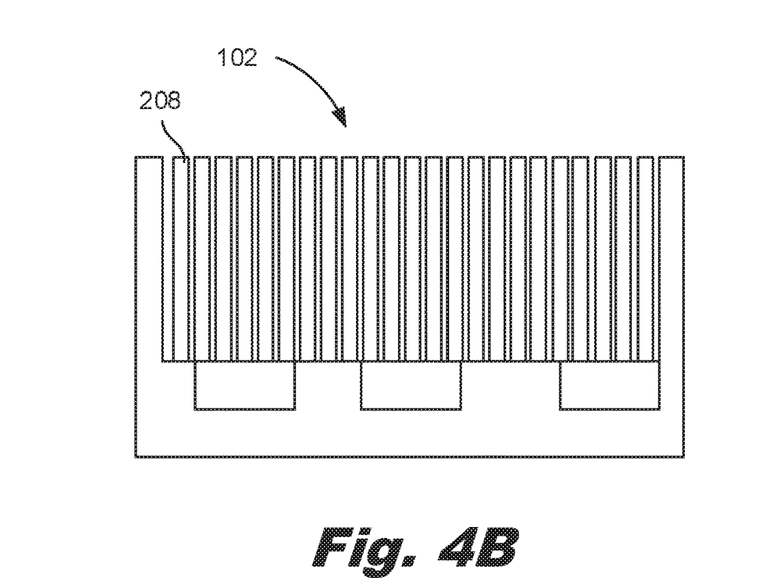

FIGS. 4A and 4B are diagrams of barriers (106) in a microfluidic channel (102), according to examples of the principles described herein. Specifically, FIG. 4A depicts a top view of chevron barriers (106) that are off-center from the microfluidic channel (102) and FIG. 4B is a cross-sectional view taken along the line A-A in FIG. 4A. As depicted in FIG. 4A and as described above, each array (FIG. 1, 104) of biomolecule-capturing pillars (208) may include multiple rows, the multiple rows of the array (FIG. 1, 104) being disposed on top of a respective barrier (106). FIG. 4A also depicts the flow of fluid through the microfluidic channel (102).

As depicted in FIG. 4B, the biomolecule-capturing pillars (208) may extend from a floor of the microfluidic channel (102) to a ceiling of the microfluidic channel (102). For example, the pillars (208) may be 200 micrometers tall such that they are flush with the top of the microfluidic channel (102) walls. Doing so may ensure that the entirety of the fluid interacts with the biomolecule-capturing pillars (208). That is, rather than some of the fluid and biomolecules flowing over the top of the biomolecule-capturing pillars (208) and thus not being potentially separated, all the fluid flows by the biomolecule-capturing pillars (208), thus further increasing the rate of biomolecule capture. In some examples, the microfluidic channel (102) is sealed at the top to create an enclosed microfluidic channel (102). In some examples, the microfluidic channel (102) is sealed with a transparent material such that a user such as a scientist may view the biomolecule capture operation or such that an imaging device may capture the biomolecule capture operation.

Figure 5:
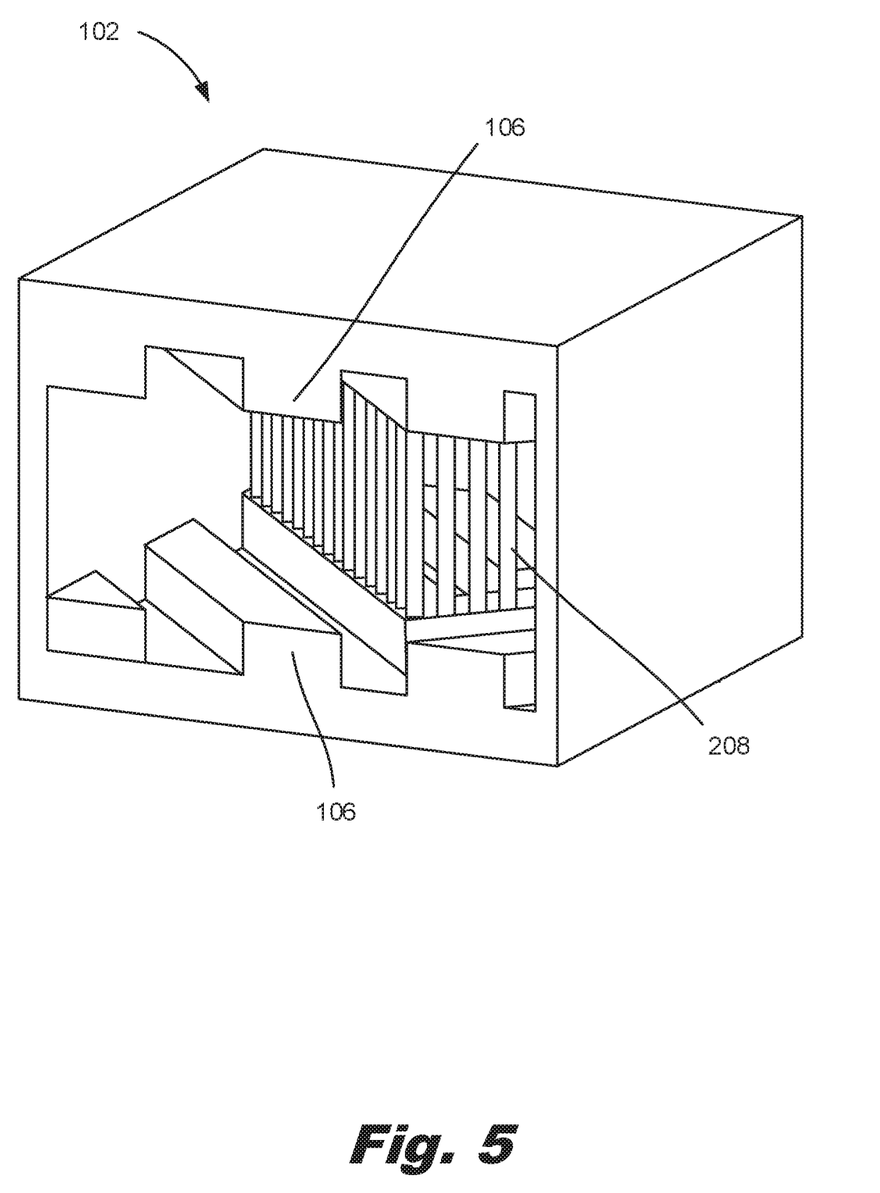
FIG. 5 is a diagram of barriers in a microfluidic channel, according to an example of the principles described herein.

FIG. 5 is a diagram of barriers (106) in a microfluidic channel (102), according to examples of the principles described herein. Specifically, FIG. 5 is a cut-away view that illustrates the barriers (106) in the floor as well as biomolecule-capturing pillars (208) disposed on a barrier (106). In the example depicted in FIG. 5, in addition to floor barriers (106), a ceiling of the microfluidic channel (102) may also include barriers (106). In the specific example depicted in FIG. 5, the floor and ceiling include chevron barriers (106), where a point of the chevron barrier (106) is parallel to a direction of fluid flow through the microfluidic channel (102). However, other types of barriers (106) such as straight barriers (106) may be implemented as well. Moreover, it may be the case that the ceiling barriers (106) are of a different size and/or shape as compared to the floor barriers (106).

The addition of ceiling barriers (106) increases the portion of fluid with vortices induced therein. That is, it may be that while certain portions of the fluid interact with the floor barriers (106), a certain portion of the fluid passes by without the vortex-inducing action of the floor barriers (106). Accordingly, with barriers (106) also formed in the ceiling, fluid stretching, folding, and chaotic mixing, is introduced into a greater portion of flow through the microfluidic channel (102). As such, even a greater degree of interaction is promoted between the biomolecules and the biomolecule-capturing pillars (208).

Figure 6:
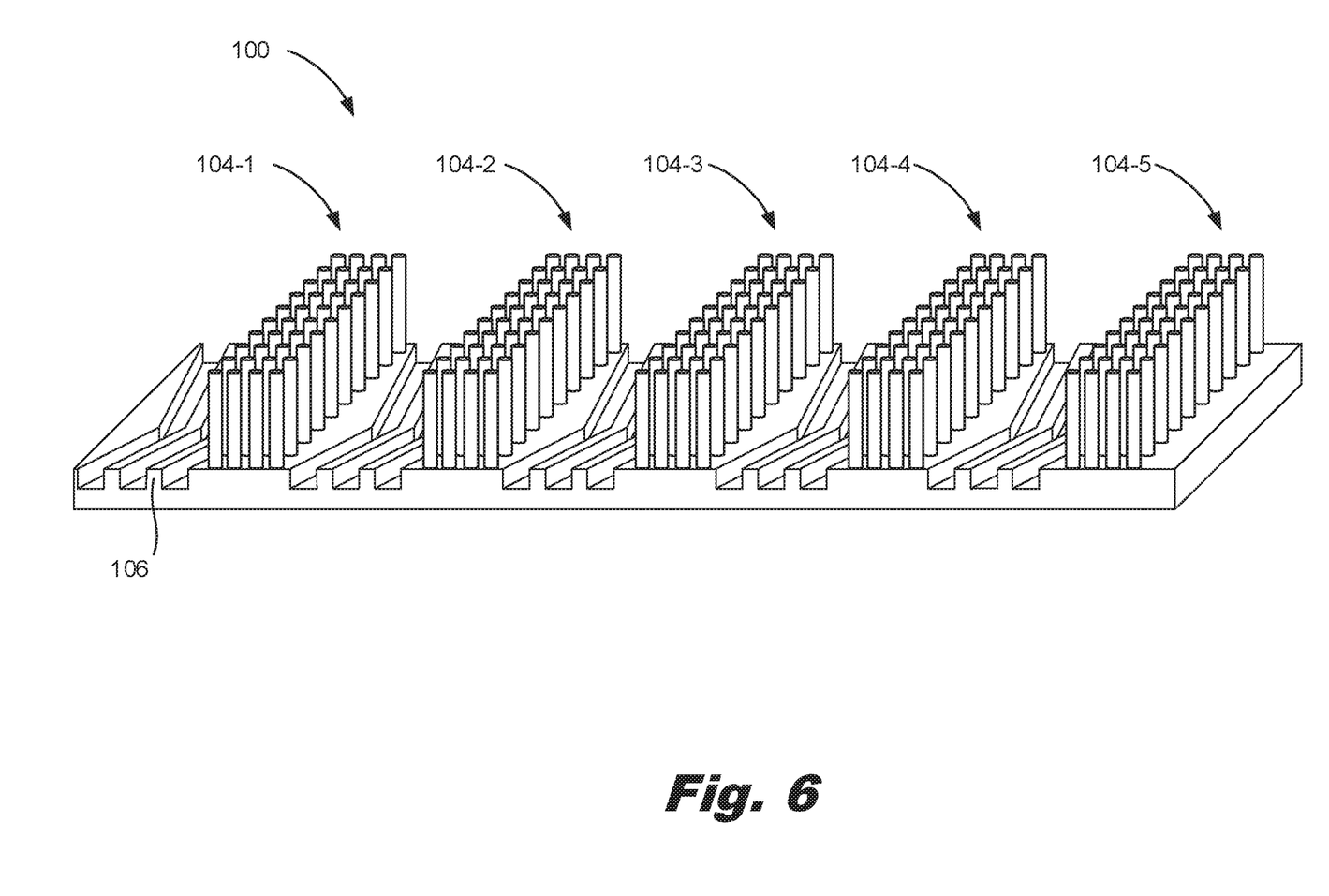
FIG. 6 is a diagram of barriers in a microfluidic channel, according to an example of the principles described herein.

FIG. 6 is a diagram of barriers (106) in a microfluidic channel (FIG. 1, 102) floor, according to examples of the principles described herein. For simplicity in illustration, the walls of the microfluidic channel (FIG. 1, 102) have been removed in FIG. 6.

FIG. 6 depicts another arrangement of the barriers (106) in the microfluidic channel (102). That is, in this example, the barriers (106) are recesses in the floor. Similar to the barriers (106) above, as fluid passes through the microfluidic channel (102), it enters the recesses, which impede laminar flow and introduce vortices and chaotic mixing into the fluid flow such that the biomolecules in the fluid reside in the microfluidic channel (102) for a longer period of time and thus have greater opportunity to interact with the biomolecule-capturing pillars (FIG. 2A, 208).

FIG. 6 also depicts multiple arrays (104-1, 104-2, 104-3, 104-4, 104-5) of biomolecule-capturing pillars (FIG. 2A, 208) where the different arrays (104) are separated from one another. Specifically, in the example depicted in FIG. 6, each array (104) is positioned between sections of the floor with barriers (106). Accordingly, the fluid is mixed and/or disturbed before it enters a biomolecule-capturing array (104) of the microfluidic channel (102). Such a mixing promotes a more uniform distribution of the biomolecules throughout the liquid carrier such that biomolecules are uniformly captured across a width of the microfluidic channel (102).

Note that in some examples, the biomolecule-capturing pillars (208) within a single array (104) may have similar features, i.e., similar cross-sectional shape and size and a similar height. However, biomolecule-capturing pillars (208) in different arrays (104) may be differently shaped and or sized. Accordingly, the different arrays (104) may filter and/or separate different biomolecules from the solution.

As a particular example, a first array (104-1) may have biomolecule-capturing pillars (208) that have a wider spacing between them so as to capture larger biomolecules leaving smaller biomolecules to pass through. The remaining arrays (104-2, 104-3, 104-4, 104-5) may have increasingly closer biomolecule-capturing pillars (208) so as to capture increasingly smaller biomolecules therein. Accordingly, the fluid manipulation system (100) may effectively capture multiple types of biomolecules from a single sample. Along these lines, the recesses or barriers (106) between different arrays (104) may be different. That is, barrier (106) geometries that may stir up certain biomolecules may not stir other, smaller particles. Accordingly, the characteristics of barriers (106) in the different regions may be particularly tailored to the particulate matter that is to be captured by the subsequent array (104) of biomolecule-capturing pillars (208).

Moreover, by interspersing barrier (106) regions with biomolecule-capturing pillars (208), a constant and continuous mixing of the fluid and biomolecules results. Doing so may yield even greater biomolecule capture as the biomolecules are homogeneously mixed, not at rest, and do not settle.

Figure 7:
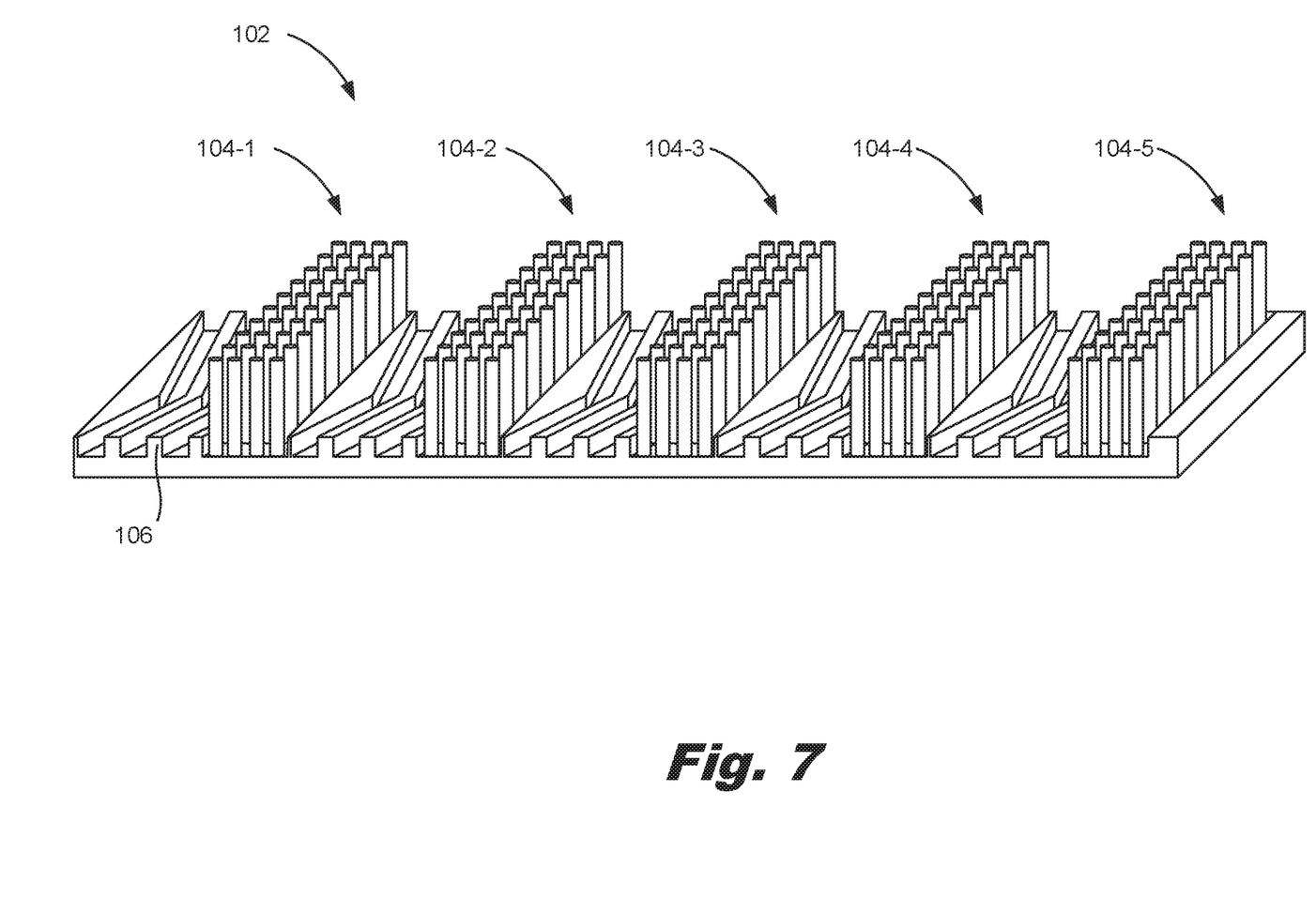
FIG. 7 is a diagram of barriers in a microfluidic channel, according to an example of the principles described herein.

FIG. 7 is a diagram of barriers (106) in a microfluidic channel (FIG. 1, 102), according to examples of the principles described herein. For simplicity in illustration, the walls of the microfluidic channel (FIG. 1, 102) have been removed in FIG. 7. FIG. 7 depicts another arrangement of the barriers (106) in the microfluidic channel (102). As depicted in FIG. 6, the barriers (106) are recesses in the floor and separate different arrays (104) of biomolecule-capturing pillars (208). However, in the example depicted in FIG. 7, the arrays (104) are seated in trenches on the floor of the microfluidic channel (102). Doing so may promote even more time in the microfluidic channel (102) for biomolecule separation by inducing more vortices in the fluid flow.

Figure 8:
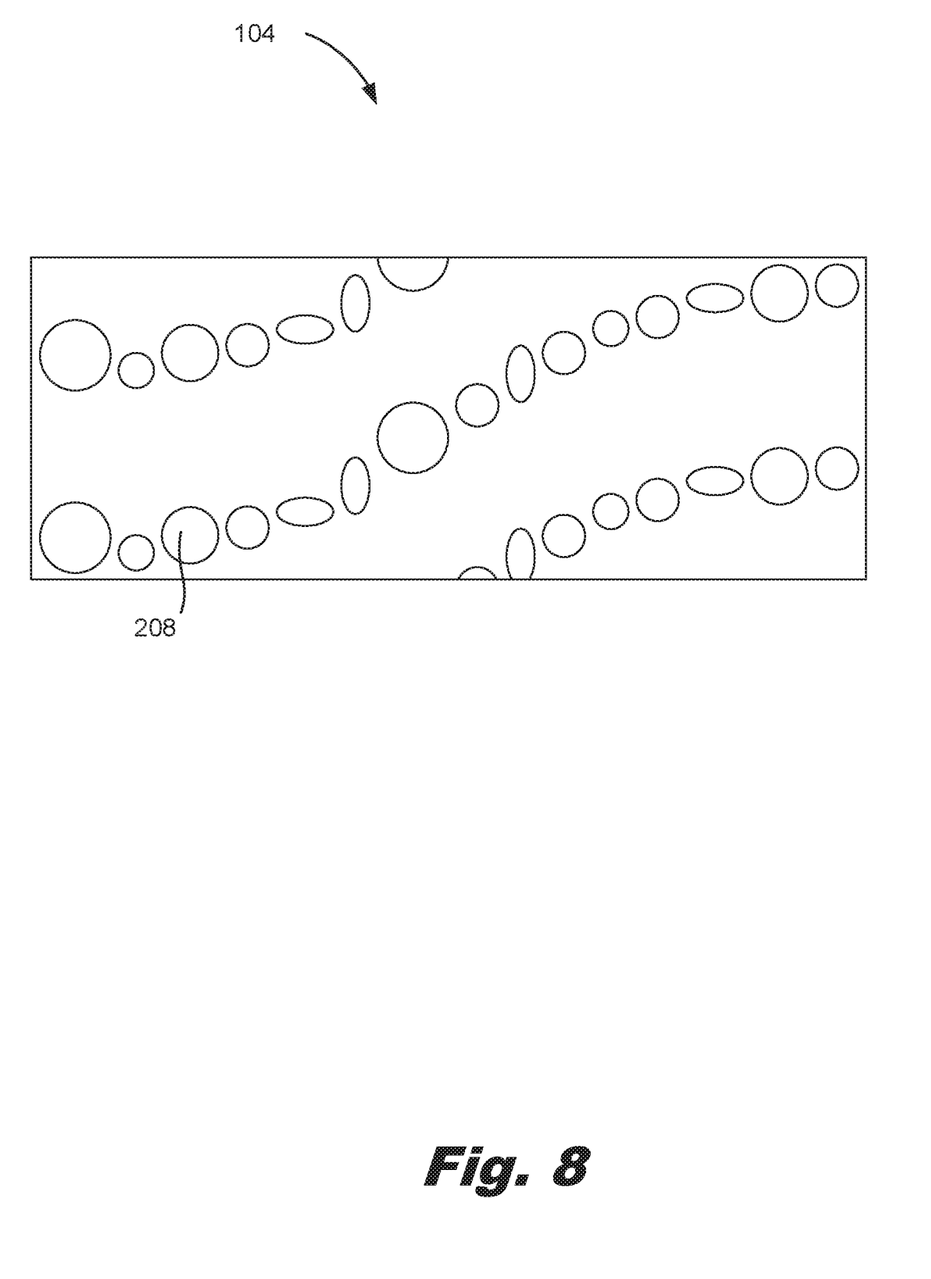
FIG. 8 is a diagram of an array of biomolecule-capturing pillars, according to an example of the principles described herein.

FIG. 8 is a diagram of a portion of an array (104) of biomolecule-capturing pillars (208), according to an example of the principles described herein. As described above, the rows of biomolecule-capturing pillars (208) may take a variety of forms including chevron rows. In the example depicted in FIG. 8, the array (104) of biomolecule-capturing pillars (208) are formed into S-shaped rows. As with the chevron rows, the S-shaped rows may increase vorticity which may result in increased mixing efficiency. The high vorticity and mixing efficiency may result in high rates of particle capture.

FIG. 8 also depicts an example wherein within an individual array (104) and row, there are biomolecule-capturing pillars (208) of differing sizes and shapes. That is, as described above in connection with FIGS. 6 and 7, it may be the case that distinct arrays (104) include biomolecule-capturing pillars (208) of different sizes, but that biomolecule-capturing pillars (208) within an array (104) may have the same size. As depicted in FIG. 8, it may be the case that the biomolecule-capturing pillars (208), even within the same array (104), may have different sizes and/or shapes.

Figure 9:
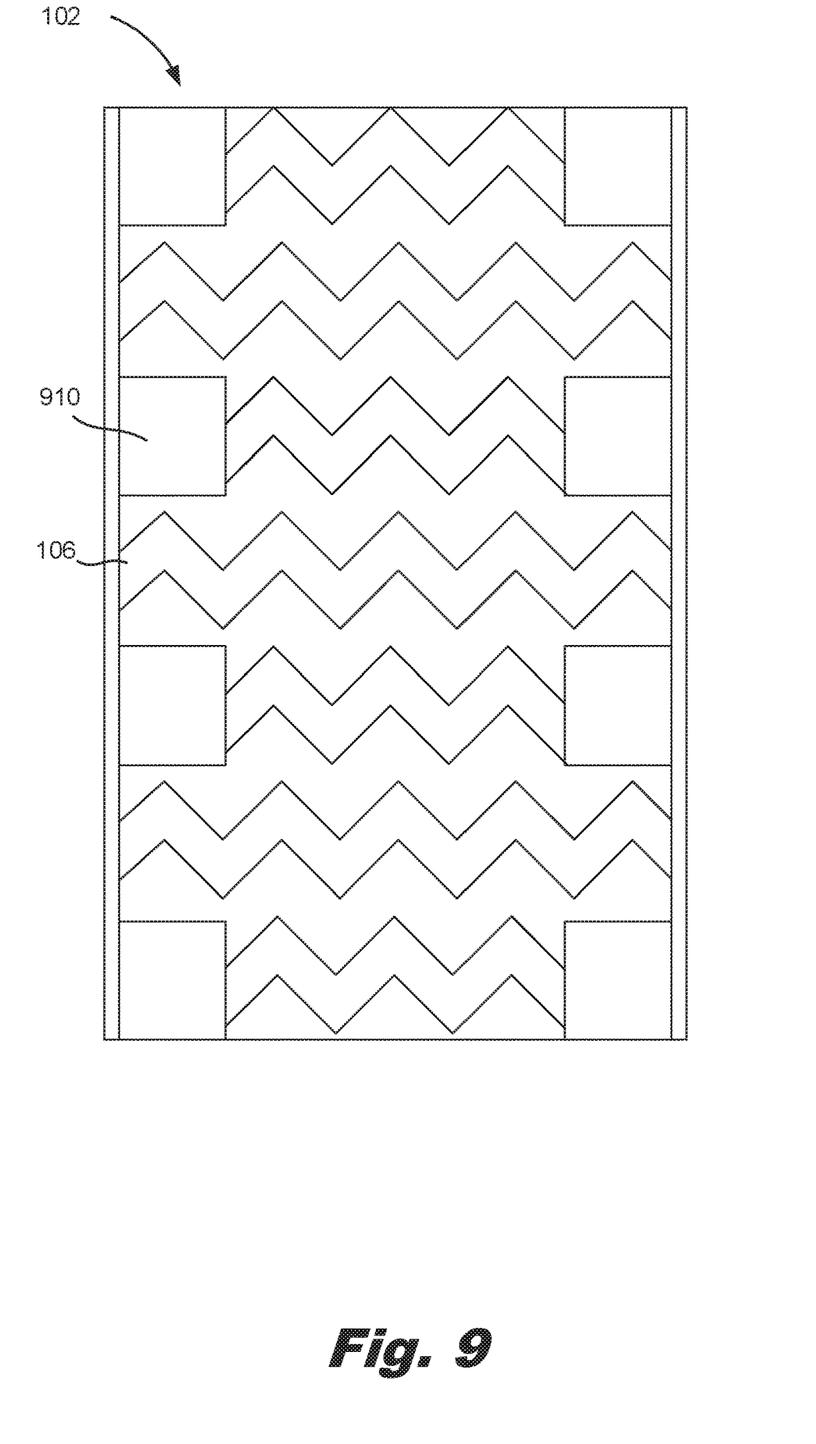
FIG. 9 is a diagram of barriers in a microfluidic channel, according to an example of the principles described herein.

FIG. 9 is a diagram of barriers (106) in a microfluidic channel (102), according to examples of the principles described herein. In the example depicted in FIG. 9, the barriers (106) are not a single chevron, or herringbone barrier (106), but a series of chevrons or herringbones in the floor of the microfluidic channel (102).

FIG. 9 also depicts an example where the microfluidic channel (102) include protrusions (910) formed in the floor or ceiling and that are adjacent walls of the microfluidic channel (102). The protrusions (910), similar to the barriers (106), induce vortices in the fluid flow. That is, similar to the barriers (106), fluid striking the surfaces of the protrusions (910) create vortices that slow fluid flow and increase the time the fluid is in the biomolecule-capturing region of the microfluidic channel (102). In some examples, the protrusions (910) generate vortices that are perpendicular to the vortices formed by the barriers (106). For example, it may be that the protrusions (910) generate vertical vortices while the barriers (106) generate horizontal vortices.

The protrusions (910) similar to the barriers (106) alter the directionality of the flow, thus reducing laminar flow. As described above, with laminar flow, the fluid may pass between biomolecule-capturing pillars (208) without interacting with them. Changing the directionality of flow promotes interactions with the biomolecule-capturing pillars (208) to enhance their biomolecule-capturing operations. While FIG. 9 depicts particular protrusion (910) shapes and orientations, the protrusions (910) may be in different shape and sizes, as well as different placement along the walls of the microfluidic channel (102) relative to the barriers (106).

Figure 10:
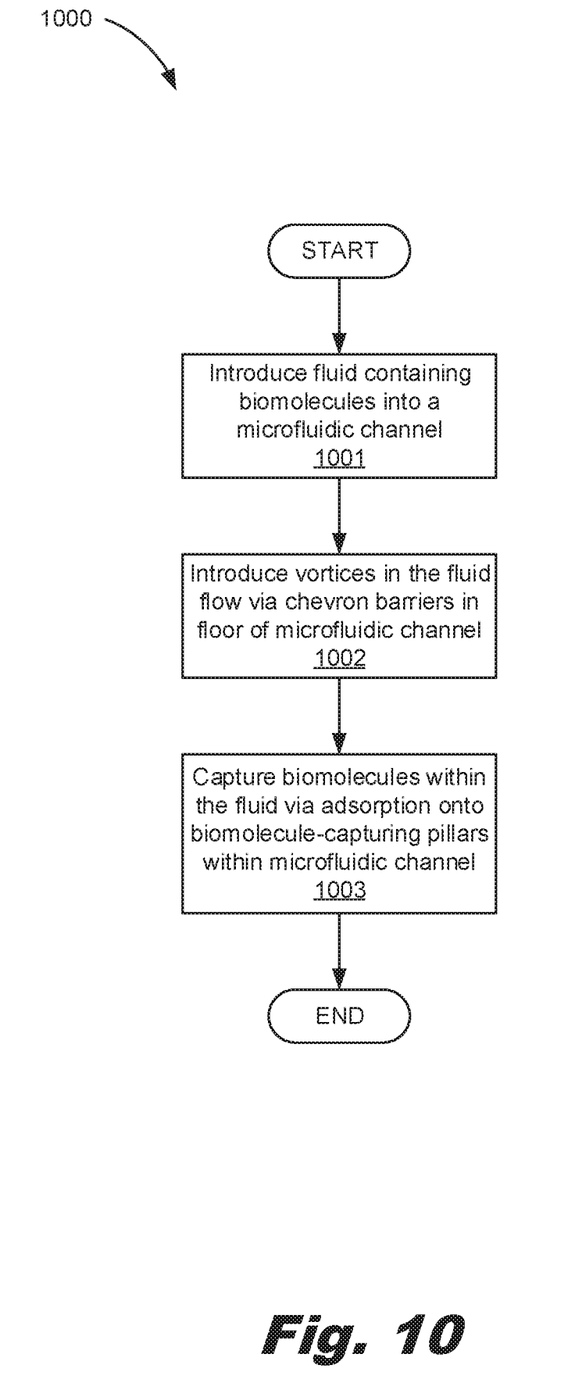
FIG. 10 is a flowchart of a method for fluid transport via microfluidic channels with barriers in the microfluidic channel, according to an example of the principles described herein.

FIG. 10 is a flowchart of a method (1000) for fluid transport via microfluidic channels (FIG. 1, 102) with barriers (FIG. 1, 106) in the microfluidic channel (FIG. 1, 104), according to an example of the principles described herein. According to the method (100), a fluid containing biomolecules is introduced (block 1001) into a microfluidic channel (FIG. 1, 102). As described above, the fluid may be of a variety of types including a solution with DNA biomolecules disposed therein. That is, the biomolecule may be nucleic acid biomolecule and in some examples the biomolecules may specifically be DNA or RNA biomolecules. The introduction (block 1001) into the microfluidic channel (FIG. 1, 102) may be via a pump that is upstream or downstream from the biomolecule-capturing region. Vortices are induced (block 1002) in the fluid flow. This may be done via barriers (FIG. 1, 106) such as chevron barriers (FIG. 1, 106) that rise from the floor of the microfluidic channel (FIG. 1, 102). The barriers (FIG. 1, 106) obstruct the flow path such that as fluid strikes the face of the barriers (FIG. 1, 106), vortices induce low Reynolds number chaotic mixing. This fluid stretching and folding and induced transverse flow changes the path of the fluid such that it is more likely to interact with biomolecule-capturing pillars (FIG. 2, 208) disposed within the microfluidic channel (FIG. 1, 102). Accordingly, the likelihood of interaction is increased due to different flow paths and is also increased because the fluid element stretching and folding slows the fluid, thus increasing the time that the fluid is in the biomolecule-capturing region. Effectively, the induced (block 1002) vortices increase the capturing radius of each biomolecule-capturing pillar (FIG. 2, 208).

Biomolecules within the fluid are then captured (block 1003) via adsorption onto biomolecule-capturing pillars (FIG. 2, 208) that are disposed within the microfluidic channel (FIG. 1, 102). That is, as described above, the biomolecule-capturing pillars (FIG. 2, 208) may have a functionalized surface to target a specific biomolecule or to target a particular class of biomolecule. For example, the biomolecule-capturing pillars (FIG. 2, 208) may include a reverse primer of a nucleic acid to capture the target nucleic acid. In another example, the biomolecule-capturing pillars (FIG. 2, 208) may include a non-specific coating, such as one that is sticky to, or captures, biologic substances.

In one particular example, the biomolecule-capturing pillars (FIG. 2, 208), rather than being functionalized to capture the biomolecules, may include beads that are functionalized to capture the biomolecules as described above.

That is, the biomolecule-capturing pillars (FIG. 2, 208) provide surface are and may include a surface feature, such as a coating or tethered beads, that captures, and in some cases draws, the biomolecules to them. Accordingly, a biomolecule-capturing pillar (FIG. 2, 208) may be designated so as to capture a particular target biomolecule. Once captured, the target biomolecule may be extracted from the biomolecule-capturing pillars (FIG. 2, 208) and the intended analysis carried out on the biomolecules.

In summary, using such a fluid manipulation system 1) provides efficient biomolecule separation from a liquid carrier; 2) may reduce the size of the fluid manipulation system by capturing more biomolecules in a smaller distance; 3) increases biomolecule time in a biomolecule-capturing region; 4) includes vortices to increase mixing and probability for biomolecule capture; 5) provides large surface for capturing biomolecules; 6) is a simple structure to integrate on a chip; 7) provides low fluidic resistance; and 8) is low cost. However, the devices disclosed herein may address other matters and deficiencies in a number of technical areas.

What is claimed is:

1. A fluid manipulation system, comprising:
a microfluidic channel through which fluid is to flow, wherein the fluid comprises biomolecules to be separated and the microfluidic channel has a floor, a ceiling, and opposing sidewalls;
at least one array of biomolecule-capturing pillars disposed within the microfluidic channel to capture biomolecules from the fluid; and
chevron-shaped barriers rising from a surface of the microfluidic channel, the chevron-shaped barriers each spanning a width of the microfluidic channel orthogonal to a flow of the fluid to induce vortices in the flow, wherein a point of a chevron-shaped barrier is parallel to the direction of fluid flow through the microfluidic channel, the at least one array of biomolecule-capturing pillars disposed entirely within a trench within the microfluidic channel recessed below the floor between adjacent chevron-shaped barriers.

2. The fluid manipulation system of claim 1, wherein: the barriers are formed on at least one of the floor of the microfluidic channel and the ceiling of the microfluidic channel.

3. The fluid manipulation system of claim 1, wherein the point of a chevron barrier is off-center from the microfluidic channel.

4. The fluid manipulation system of claim 1, wherein barriers are formed on multiple surfaces of the microfluidic channel.

5. The fluid manipulation system of claim 1, wherein:
the at least one array of biomolecule-capturing pillars comprises multiple arrays of biomolecule-capturing pillars; and
each array is positioned between sections of the surface of the microfluidic channel with barriers.

6. The fluid manipulation system of claim 1, wherein the at least one array of biomolecule-capturing pillars is formed in at least one of chevron rows, s-shaped rows, and sigmoidal rows.

7. The fluid manipulation system of claim 1, wherein the at least one array of biomolecule-capturing pillars comprises biomolecule-capturing pillars of differing sizes.

8. The fluid manipulation system of claim 1, further comprising protrusions rise from at least one of the floor and the ceiling of the microfluidic channel and are formed along the sidewalls of the microfluidic channel.

9. The fluid manipulation system of claim 1, wherein the biomolecule capturing pillars extend to the ceiling of the microfluidic channel.

10. A method, comprising:
introducing fluid containing biomolecules into a microfluidic channel having a floor, a ceiling, and opposing sidewalls;
inducing vortices in a fluid flow via chevron-shaped barriers rising from a surface of the microfluidic channel, the chevron-shaped barriers each spanning a width of the microfluidic channel orthogonal to a flow of the fluid to induce the vortices in the fluid flow, wherein points of the chevron-shaped barriers are parallel to a direction of fluid flow through the microfluidic channel; and
capturing biomolecules within the fluid via adsorption onto biomolecule-capturing pillars within the microfluidic channel, biomolecule-capturing pillars disposed entirely within a trench within the microfluidic channel recessed below the floor between adjacent chevron-shaped barriers.

11. The method of claim 10, wherein the biomolecule to be captured is nucleic acid from a sample.

12. A fluid manipulation system, comprising:
a microfluidic channel through which fluid is to flow, wherein the fluid comprises biomolecules to be separated and the microfluidic channel has a floor, a ceiling, and opposing sidewalls;
at least one array of biomolecule-capturing pillars disposed within the microfluidic channel to capture biomolecules from the fluid; and
chevron-shaped barriers rising from a surface of the microfluidic channel, the chevron-shaped barriers each spanning a width of the microfluidic channel orthogonal to a flow of the fluid to induce vortices in the flow, wherein a point of a chevron-shaped barrier is parallel to the direction of fluid flow through the microfluidic channel,
wherein the chevron-shaped barriers are formed in the floor, each chevron-shaped barrier comprising a plurality of the at least one array of biomolecule-capturing pillars extending from the chevron-shaped barrier to the ceiling.

* * * * *